United States Patent [19]

Seki

[11] Patent Number: 4,890,213
[45] Date of Patent: Dec. 26, 1989

[54] POWER CONVERTER DEVICE HAVING STARTING CIRCUITS AND A METHOD FOR STARTING THE POWER CONVERTER DEVICE

[75] Inventor: Nagataka Seki, Tokyo, Japan

[73] Assignee: Kabushiki Kaisha Toshiba, Kawasaki, Japan

[21] Appl. No.: 279,277

[22] Filed: Dec. 2, 1988

Related U.S. Application Data

[63] Continuation of Ser. No. 198,851, May 26, 1988, abandoned.

[30] Foreign Application Priority Data

May 28, 1987 [JP] Japan .................. 62-129616

[51] Int. Cl.[4] .................................. H02J 3/36
[52] U.S. Cl. ........................ 363/49; 307/82; 307/85; 363/51; 363/72
[58] Field of Search .............. 363/35, 49, 51, 72; 307/45, 77, 82, 83, 85–87; 323/207; 361/91

[56] References Cited

U.S. PATENT DOCUMENTS 3,816,809  6/1974  Kuster ........................... 361/91
4,133,026  1/1979  Hausler ......................... 363/49
4,482,031 11/1984  Yoshida et al. ............... 363/35

FOREIGN PATENT DOCUMENTS 152595  8/1985  European Pat. Off. ........ 363/35
752607  7/1980  U.S.S.R. ........................ 363/35

OTHER PUBLICATIONS

IEEE Transactions on PAS vol. PAS-98, No. 4, Jul.-/Aug. 1979, "Progress in Self Commutated Inverters for Fuel Cells and Batteries", G. A. Phillips et al.

Primary Examiner—William H. Beha, Jr.
Attorney, Agent, or Firm—Oblon, Spivak, McClelland, Maier & Neustadt

[57] ABSTRACT

A power converter device including a plurality of self-commutated voltage type converters each connected to a common dc circuit, a plurality of transformers each having dc windings and ac windings, each of the dc windings being connected to an ac output terminal of a respective one of the converters and each of the ac windings connected in series, an ac switch through which the serially connected ac windings of the transformers are connected to utility power systems, a capacitor provided in the common dc circuit, a dc overvoltage suppression means installed in the common dc circuit, and a current limiting device, wherein the capacitor in the common dc circuit is charged through the current limiting device means before starting the self-commutated voltage type converters, and the dc overvoltage suppression means is then connected to the common dc circuit and removed after the self-commutated voltage type converters are started.

14 Claims, 8 Drawing Sheets

4,890,213

POWER CONVERTER DEVICE HAVING STARTING CIRCUITS AND A METHOD FOR STARTING THE POWER CONVERTER DEVICE

This application is a Continuation of application Ser. No. 198,851, filed on May 26, 1988, now abandoned.

BACKGROUND OF THE INVENTION

1. Field of the Invention

This invention relates to a power converter device for interconnecting alternating current systems, and more particularly to a power converter device wherein the alternating current windings of a plurality of transformer units are connected in series, and are respectively connected to a plurality of self-commutated voltage type converter units.

2. Discussion of Background

FIG. 6 shows a schematic block diagram of a conventional widely used power converter device for interconnecting alternating current systems. Reference numerals 11 and 21 designate three-phase self-commutated voltage type inverter units (hereinbelow called inverter units); 12, 22 designate system interconnecting reactors; 13, 23 designate isolating transformer units; 14, 24 designate windings of transformer units 13, 23; 15, 25 likewise designate a.c. windings.

The a.c. windings 15 and 25 of transformer units 13, 23 are connected in series in each phase. Their outputs are connected to a.c. system 32 through a.c. switches 31. In contrast, both the d.c. sides of inverter units 11 and 21 have a common d.c. power source 33. A capacitor 34 is connected to the d.c. circuit. The a.c. windings 15 and 25 of transformer units 13 and 23 form what is called a zig-zag connection. This is a widely used method of connection in order to obtain the advantage that, when inverter units 11 and 21 are operated with a mutual phase difference of 30°, no harmonic components other than the $(12p\pm1)$-th order harmonics ($p=1, 2 ...$) are contained in the resultant output of transformer units 13 and 23.

Operation of the conventional power converter device for system interconnection shown in FIG. 6 is initiated as follows. Inverter units 11, 21 are started in operation by a signal from a control circuit, not shown. The rise of the output voltage of inverter units 11, 21 from zero is made gradual, to avoid excitation rush current in transformer units 13, 23. A.C. switches 31 are closed when the amplitude and phase of the resultant voltage of a.c. windings 15, 25 of transformer units 13, 23 coincide with the amplitude and phase of the voltage of system 32. This is called synchronous making. In case of malfunction or interruption, a.c. switches 31 are opened simultaneously with cessation of operation of inverter units 11, 21. The time between stopping of inverter units 11, 21 and opening of a.c. switches 31 is less than 0.1 second, to avoid the problem to be discussed below.

Self-commutated inverters for system interconnection have recently begun to be used in systems such as solar generators or fuel cells. System interconnection based on self-commutated inverters, in the case where the a.c. system is weak, are of superior stability compared with system interconnection based on externally commutated inverters. The reason for this is that, in the case of externally commutated inverters commutation of the thyristors depends on the voltage of the a.c. system, so commutation of the thyristors may be prevented by disturbance of the system voltage, i.e. so-called commutation failure occurs. To deal with this, in the case of a self-commutated inverter, commutation of the thyristor is performed by a commutation circuit within the inverter, so disturbance of the system voltage does not immediately result in commutation failure. However, in the aforementioned operation control system, operation of inverter units 11, 21 may be temporarily cut off by generation of a.c. overcurrent if for example there is an instantaneous voltage fluctuation of the a.c. system. In this case, it is difficult to restart the operation immediately when the voltage is reset. The reason for this is that a.c. switches 31 must open whenever a.c. overcurrent occurs. This gives rise to the problem that: (a) once stoppage has occurred, about five seconds is required from recommencement of operation until synchronous making, and (b) the life of a.c. switches 31 is adversely affected by frequent switching of a.c. switches 31.

If it is assumed that an operating scheme is chosen according to which closure of a.c. switches 31 is followed by operation of the inverter, it might be thought that, for the aforementioned overcurrent protection, it would be sufficient simple to stop the operation of the inverter, i.e. simply to stop the on/off operation of the gate of the GTO. This ought to have the effect of stopping a.c. switches 31 from opening. However, it has been found that there are two problems in doing this. One is the d.c. overvoltage generated in the transient period when the connection of the transformers to the system is closed, and the other is the d.c. overvoltage in the steady state.

First discussed is the d.c. overvoltage in the transient period. Since, as shown in FIG. 6, a.c. windings 15 and 25 are connected in series, if, at the instant when a.c. switches 31 are closed, the a.c. voltage is not applied to the two transformers 13 and 23 equally, the result is the appearance of an alternating current having a high peak, quite different from a sine wave. The first cause of this is that the initial magnetization state of the two transformers is not the same. The second cause is that there is high impedance for high frequencies of harmonic order other than $12p\pm1(p=1, 2 ...)$, because of the zig-zag connection, so the harmonic exciting current components needed to induce a sine wave voltage cannot flow. That is, the excitation characteristic of the iron core is not totally linear, but rather is a non-linear curve having hysteresis. Since, in order to create a sine wave voltage, high frequencies must be contained in the exciting current, if there is some restriction that prevents these high frequencies from flowing, the induced voltage will not be a sine wave.

In experiments, on transition, the peak value of the voltage induced in d.c. windings 14 and 24 of transformer units 13 and 23 was about 2.9 times the root mean square value of the sine wave. The d.c. voltage of the capacitor 34 is therefore charged up to this value.

The second problem concerns d.c. overvoltage in the steady state. As described above, the induced voltage is not a simple sine wave, but contains harmonic components. It has been experimentally determined that a peak value of about 2.4 times the root mean square value of the sine wave appears. The d.c. voltage of the capacitor 34 was charged up to this value. FIG. 8 shows measured waveforms obtained by experiment as described above.

In the above description, it is assumed that inverter units 11 and 21 are employed. However, this invention is applicable not merely to conversion from d.c. to a.c., but also to reactive power compensator devices, or rectifiers whose power factor can be regulated, so hereinbelow, numerals 11 and 21 refer generally to self-commutated voltage type converters, and the whole system will be taken as being a power converter device.

SUMMARY OF THE INVENTION

Accordingly, one object of this invention is to provide a new and improved power converter device having a plurality of self-commutated voltage type converter units and corresponding transformer units, provided with effective means of preventing d.c. overvoltage generated, in the case where the a.c. windings of the transformer units are connected in series, when the transformer units are connected to the a.c. system.

The above and other objects are achieved according to the invention by providing a power converter device in which the peak value of the voltage induced in the d.c. windings of the transformer units is limited by charging the d.c. circuit capacitor through a current limiting device, thereby preventing excess transient voltage. Also, by providing a d.c. overvoltage suppression device consisting of a resistor and circuit breaker device connected in series in the d.c. circuit, the voltage waveform in steady state can be made to approach more closely to a sine wave, thereby suppressing overvoltage of the d.c. circuit.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
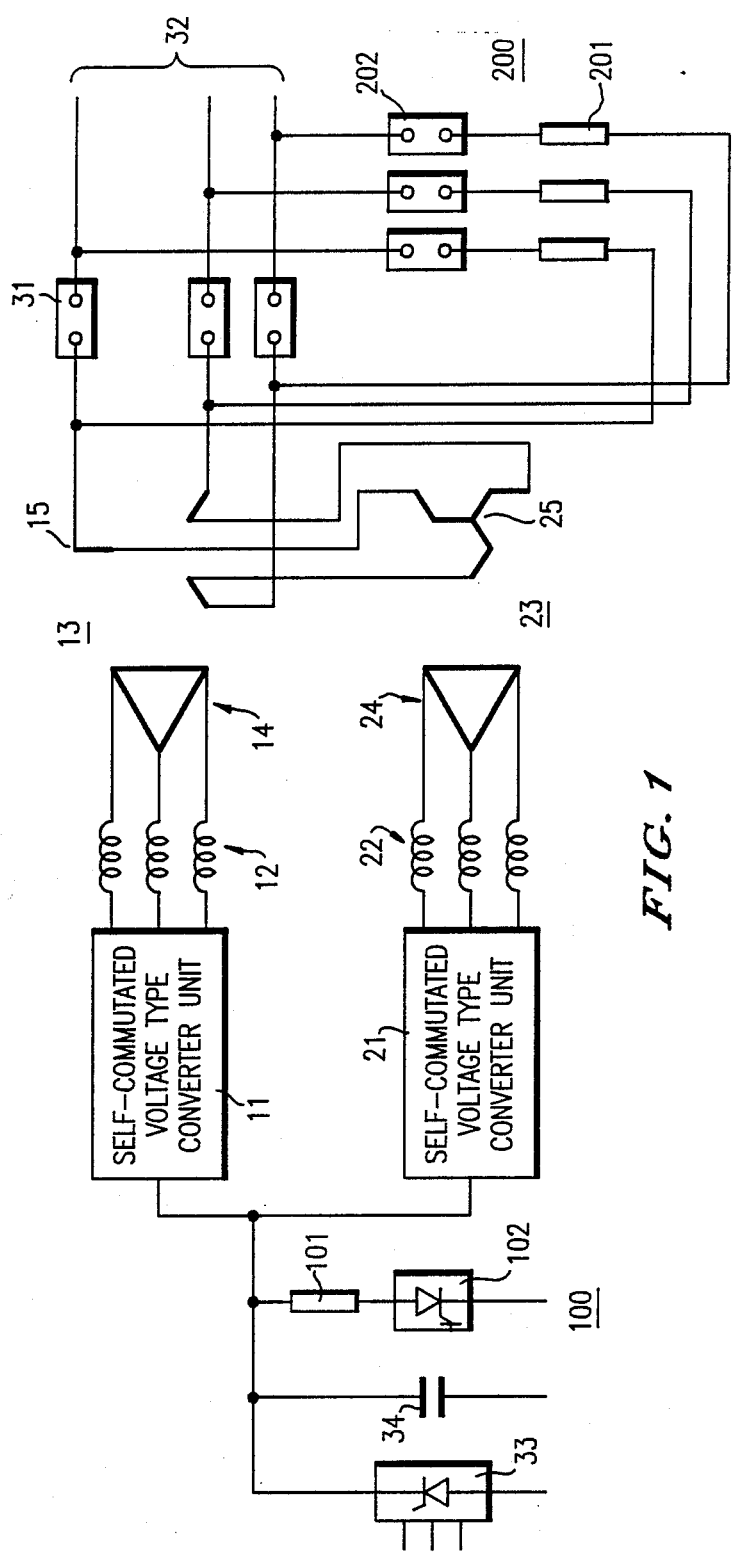
FIG. 1 is a schematic block diagram showing an embodiment of the present invention.

Referring now to the drawings, wherein like reference numerals designate identical or corresponding parts throughout the several views, and more particularly to FIG. 1 thereof, an embodiment of this invention will be described. In FIG. 1, reference numeral 100 designates a d.c. overvoltage suppression device. This consists of a resistor 101 and circuit breaker device 102. Reference numeral 200 designates a current limiting device, consisting of current limiting elements 201 such as resistors or reactors, and a.c. switches 202. Reference numerals 11 and 21 designate the self-commutated voltage type converter units.

Figure 7:
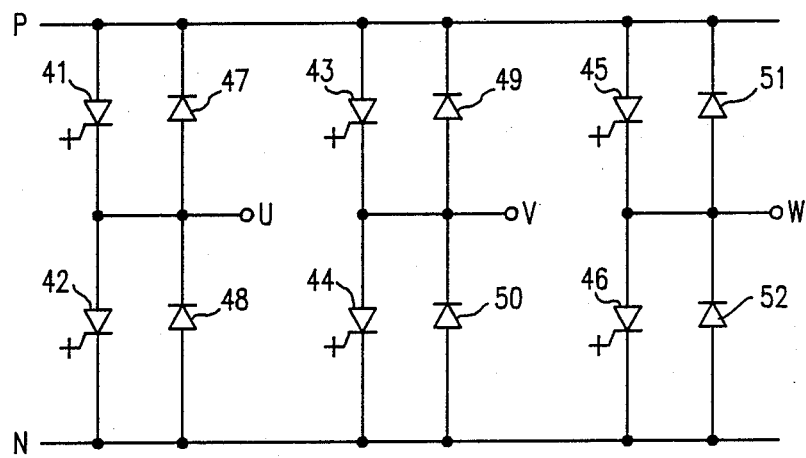
FIG. 7 is a circuit diagram showing a specific example of a self-commutated voltage type converter unit.
Figure 6:
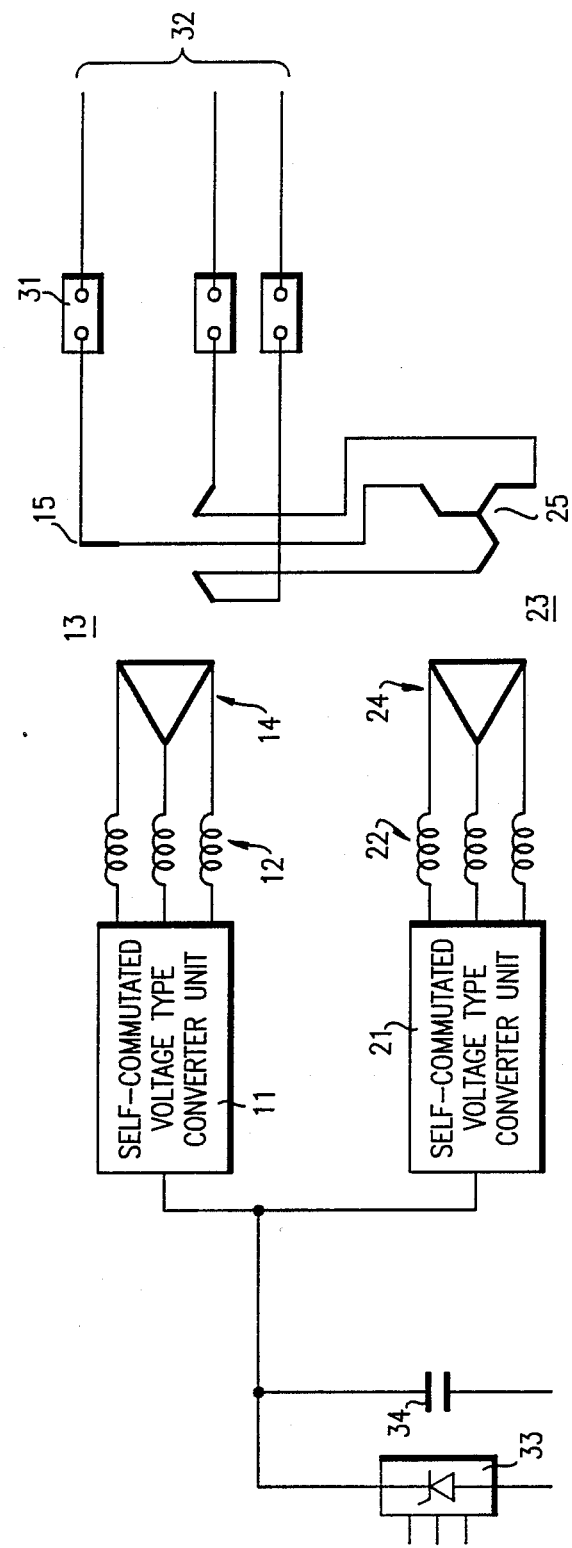
FIG. 6 is a schematic block diagram of a conventional power converting device.
Figure 8A:
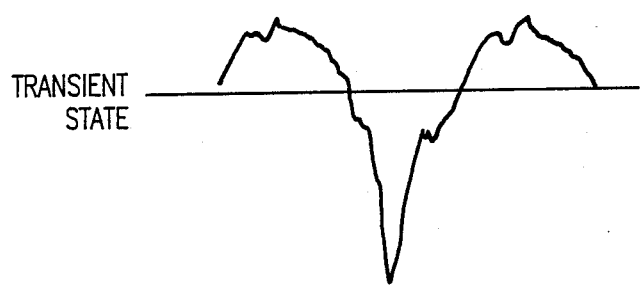
FIGS. 8a and 8b are an illustration of d.c. winding voltage waveforms of the transformer units in the conventional device of FIG. 6.
Figure 8B:

A typical example of self-commutated voltage type converter units 11 and 21 is shown in FIG. 7. In this Figure, reference numerals 41 to 46 designate GTOs, and 47 to 52 designate diodes. This inverter circuit has recently been very widely employed, so a detailed description of it will be omitted.

Prior to operation of this power converter device, circuit breaker device 102 and a.c. switch 202 are closed. It should be noted that normally, the d.c. circuit gives a preparatory charge to the capacitor 34 up to a prescribed level. A.C. switches 31 are then closed. However, current limiting device 200 also has the effect of suppressing the charging current of capacitor 34, so preparatory charging is not necessarily essential. The rush current of transformer units 13 and 23 is suppressed by current limiting device 200, so that transformer units 13 and 23 are not saturated. Consequently, capacitor 34 is not charged to a value higher than the prescribed value. Charging is performed through diodes 47 to 52 shown in FIG. 7.

When the charging current becomes practically zero, the impedance of transformer units 13, 23 seen from the a.c. side is about the same as the excitation impedance, so the voltage drop of the current limiting elements 201 becomes extremely small. Consequently, when a.c. switches 31 are closed, the transient voltage of transformer units 13, 23 can be neglected. In the subsequent steady state, the current path in respect of high frequency generated in d.c. windings 14, 24 is from diodes 47, 49, 51 of the upper arms of self-commutated voltage type converter units 11, 21 to resistor 101 to circuit breaker device 102 to diodes 48, 50, 52 of the lower arms of self-commutated voltage type converter units 11, 21. As a result, the amount of harmonic voltage is considerably reduced, and the waveform approaches a sine wave voltage. By experiment, it has been found that, for the magnitude of the resistor 101, a value of about one-fifth of the total excitation capacity of transformer units 13, 23 is suitable. If therefore it is provisionally assumed that the excitation capacity is 2%, a resistor of capacity (i.e. capacity of power in units of watts, for example) about 0.4% should be inserted in the d.c. circuit. In other words, the rated capacity, in watts, of the resistor should be 0.4% of the rated capacity of transformer units 13, 23. However, this is a factor lowering the efficiency during operation, so in cases where high efficiency is required, it is desirable to arrange for insertion and removal of a resistor to be linked to the changeover between stopping and operation. In this case, circuit breaker device 102 may appropriately be a semiconductor switching element such as a GTO.

The rated capacity of resistor 101 in FIG. 1 is preferably low, since a delta connection of transformer d.c. windings 14, 24 has smaller impedance to the third harmonic and the sixth harmonic, etc. In the case of a Y connection, the rated capacity of resistor 101 should be about half the transformer excitation rated capacity.

Figure 2:
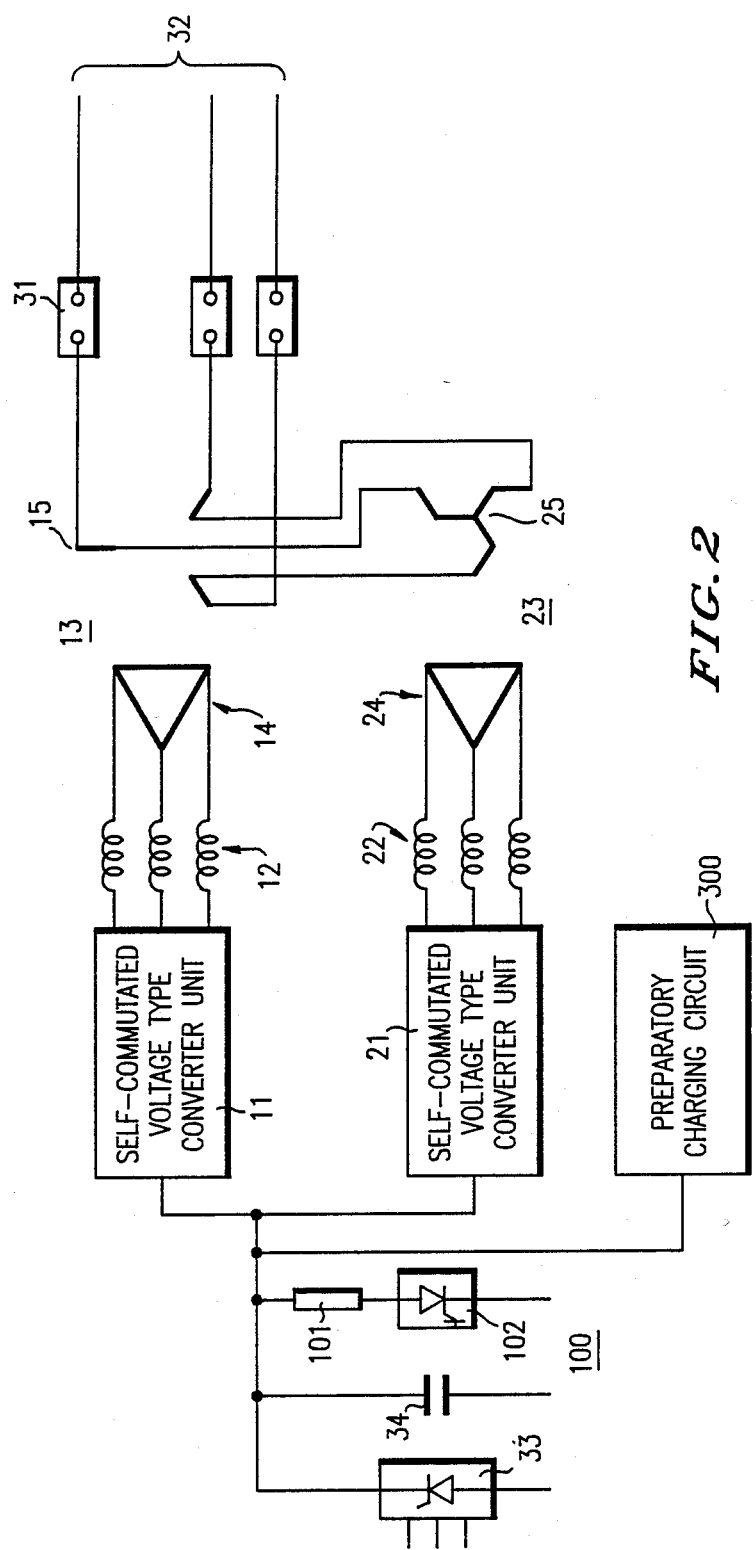
FIG. 2 is a schematic block diagram showing another of the present invention.

FIG. 2 shows another embodiment of this invention. The difference between this and the embodiment shown in FIG. 1 is that a current limiting device 200 to control the rush current of transformer units 13 and 23 is not used, but, instead, the rush current is suppressed by selecting the magnetic flux density in the rated use state of the transformers to a value less than half of the maximum magnetic flux density of the iron core. However, in this case, a circuit is required that effects preparatory charging of capacitor 34 to the prescribed value. Reference numeral 300 in the Figure designate the preparatory charging circuit.

Figure 3A:
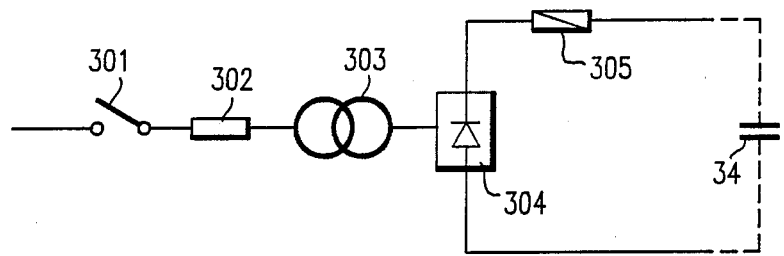
FIGS. 3a and 3b are circuit diagrams showing examples of a preparatory charging circuit in FIG. 2.
Figure 3B:
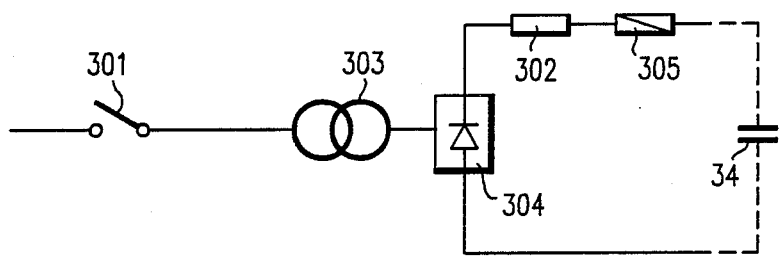

An example of a preparatory charging circuit 300 is shown in FIG. 3. It consists of a.c. switch 301, resistor 302, transformer 303, rectifier 304 and fuse 305.

When a.c. switch 301 is closed, capacitor 34 is charged by the path: resistor 302 to transformer 303 to rectifier 304 to fuse 305. The magnitude of the charging current of capacitor 34 is restricted by resistor 302. If the capacitor is precharged by preparatory charging circuit 300 in this way, when the a.c. switches 31 are closed, there is no possibility of very large current flowing in the a.c. winding and d.c. winding of transformer units 13 and 23. Resistor 101 and circuit breaker device 102 are useful for overvoltage prevention in the steady state. Circuit breaker device 102 is also closed in linked manner with the closure of a.c. switches 31. After self-commutated voltage type converter units 11 and 21 operate, circuit breaker device 102 is open-circuited. A.C. switch 301 can be open-circuited after closure of a.c. switches 31, provided that, if the d.c. power source is one that is capable of "soft start", as in the case of a thyristor rectifier, it is possible to give this function to the d.c. power source without using a preparatory charging circuit.

Figure 4:
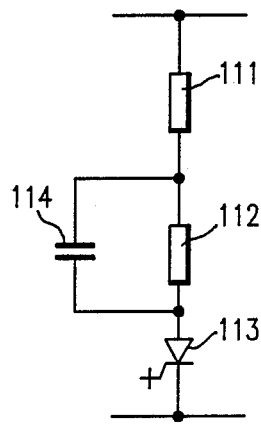
FIGS. 4 and 5 are schematic block diagrams of respective different d.c. overvoltage suppression devices in FIG. 1 and FIG. 2.

FIG. 4 shows another embodiment of the d.c. overvoltage suppression device 100 provided in the d.c. circuit. Reference numerals 111 and 112 designate resistors, 113 designates a circuit breaker device, and 114 designates a capacitor.

When the current limiting element 201 of FIG. 1 is constituted by a current limiting reactor, low frequency oscillations are produced by the capacitance of capacitor 34 and the inductance of the current limiting reactor and transformer units 13 and 23. In order to prevent this, it is more effective to use a combination of resistor and capacitor, as shown in FIG. 4, than to use a resistor. The size of the capacitor 114 is about the same as, or larger than, capacitor 34. The resistance of resistor 111 is as small as is permitted by the circuit breaker device 113.

Figure 5:
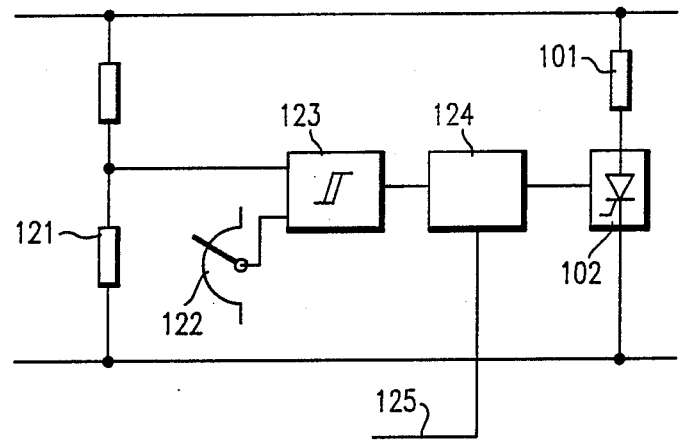

FIG. 5 is a view showing another example of a d.c. overvoltage suppressing device 100. Reference numeral 121 designates a voltage detector, 122 designates a level setter, 123 designates a hysteresis comparator, and 124 designates a control device. Hysteresis comparator 123 generates an output of "1" when the detected value of d.c. voltage exceeds the value of the level setter 122, and closes the circuit breaker device 102 by means of control device 124. If the d.c. voltage gets below a certain limit, the output of hysteresis comparator 123 becomes "0" and circuit breaker device 102 is open-circuited. Reference numeral 125 designates the "1" signal during operation used to prevent closure of circuit breaker device 102 during operation.

Figure 9:
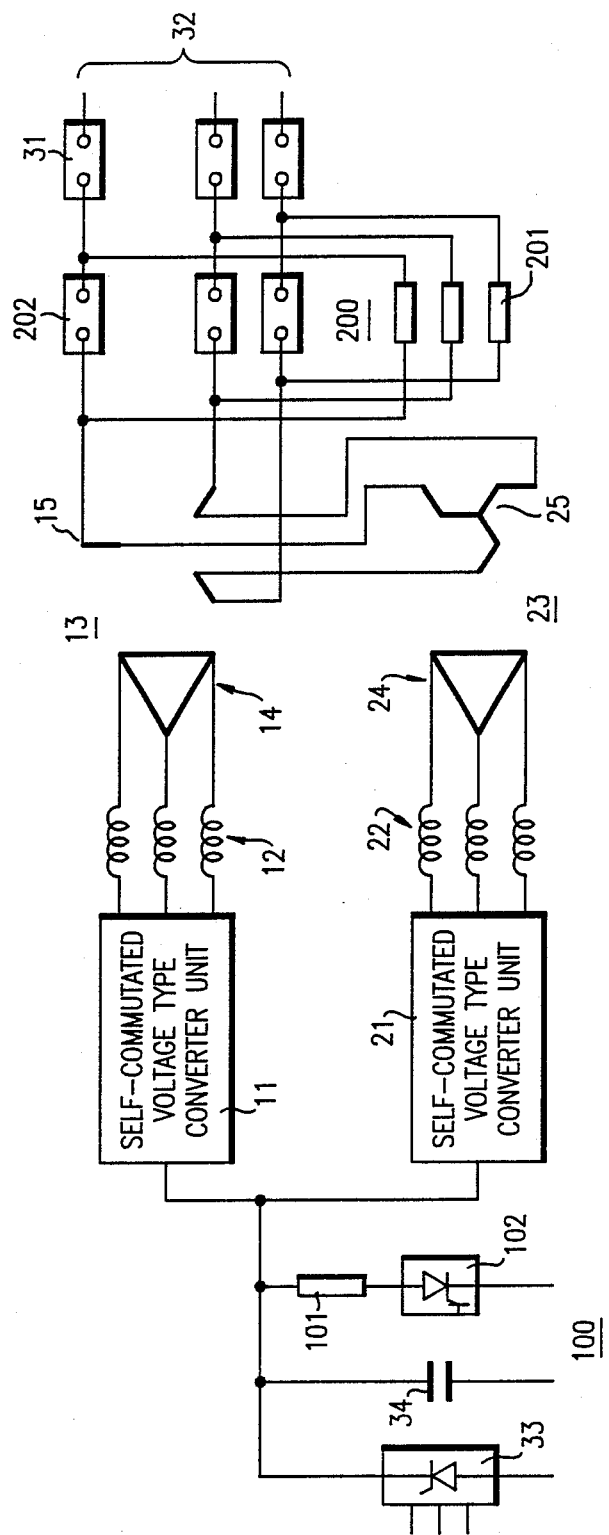
FIG. 9 is a schematic block diagram showing yet another embodiment of the present invention.

FIG. 9 is a schematic diagram showing yet a further embodiment of this invention. The only difference between it and FIG. 1 is that the current limiting device 200 is inserted in series with a.c. switches 31. That is, transformer units 13, 23 are excited through current limiting element 201 by closure of a.c. switches 31, thereby preventing transient voltage. Next, by closing a.c. switch 202, the system shifts to steady state. Otherwise, the situation is as shown in FIG. 1. Examples of delta connection of a.c. windings 25 of transformer unit 23 to provide a transformer unit connection to remove specific higher harmonics are given in the literature (for example, the delta connection connected as shown at page 172 of "Turnoff Thyristors" compiled by N. Seki, M. Kurada, and M. Takeuchi published by Denki Shoin on 20th Apr. 1983).

As embodiments of this invention, examples have been illustrated in FIG. 1 and FIG. 2 showing in each case two inverter units and two transformer units. However, this invention can be applied to other connections such as systems for removing high frequencies other than $18p \pm 1$ ($p=1, 2 \ldots$) by using three sets of transformer units with a mutual phase difference of 20°.

Reactors 12 and 22 in FIG. 1 and 2 are provided between inverter units 11 and 21 and transformer units 13 and 23. However, this invention could be applied also in the case where they are provided between a.c. switches 31 and transformer units 13 and 23. Specifically, although reactors 12 and 22 have a current limiting effect on transformer units 13 and 23, normally reactors 12 and 22 are at the most about 20%, where 20% indicates the value of percent impedance of reactors 12, 22, which is too small in relation to the approximately 50% value that is needed to achieve the objective of current limitation.

The d.c. power source referred to here means an irreversible power source such as a thyristor rectifier, fuel cell, or solar cell etc. and does not include an accumulator.

Figure 10:
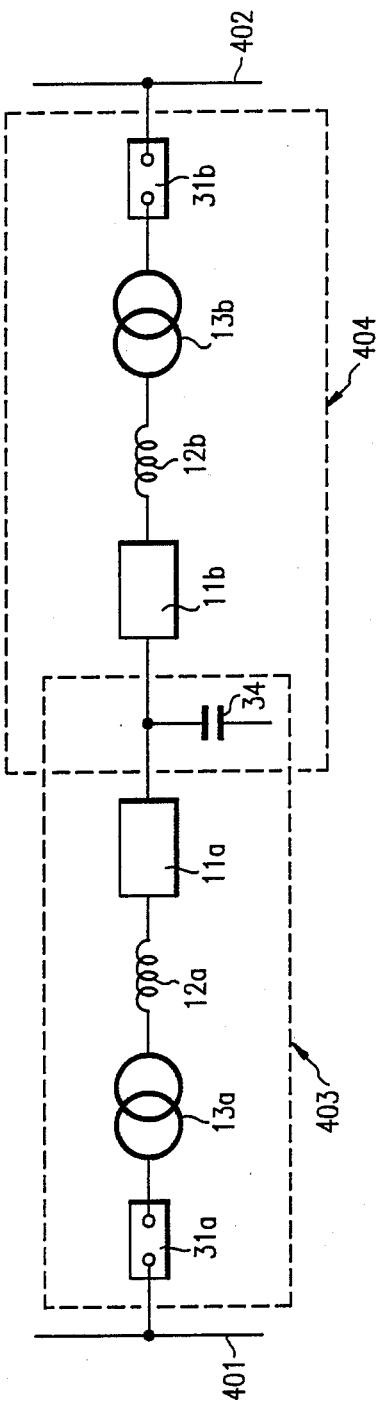
FIG. 10 is a schematic block diagram showing an example of a system to which the present invention is applied.

However, in a system that performs a.c.-d.c.-a.c. conversion, as in the case of a d.c. power transmission system, use of a system as shown in FIG. 10 may be considered, in which the circuit shown in FIG. 1 is employed with two d.c. parts in common. In the FIG. 10, reference numerals 401 and 402 designate different systems, 403 and 404 designate power converter devices described in FIG. 1, and these have their d.c. parts in common. In the d.c. power transmission system of FIG. 1, this invention can be applied when one of the a.c. switches at both ends is closed. It should be noted that insertion of a resistor in the conventional d.c. circuit was carried out in the following cases:

(a) for discharge of d.c. circuit capacitors; and
(b) in a motor drive inverter, for consumption of regenerated energy from the motor.

First of all, in case (a), the resistor is normally a high resistance, with the objective of discharge, and stays inserted during operation. This is similar to the present invention in that resistance is low when discharge in a short time is required during stoppage, or is used only during stoppage. However, in this case, the resistance is determined by the capacity of the capacitor and the necessary discharge time, and a short time can be employed. In contrast, in the case of the preset invention, as described above, the resistance is determined by the excitation capacity of transformers 13 and 23, and the period for which it is applied is unrelated to the resistance.

Whereas in case (b), a resistor is required during operation, in this invention, the resistor is used during stoppage. Thus, although the circuit is similar, the object of use and conditions of use are clearly different.

In power converter systems for system interconnection employing self-commutated voltage type converters, an example wherein the transformer effects initial charging from the system is described in I.E.E.E. Transactions on Power Apparatus and Systems, Volume PAS-98, No. 4, July/August, 1979, "Progress in Self-Commutated Inverters for Fuel Cells and Batteries" G. A. Phillips, J. E. Walton, F. J. Kornbrust (UTC). FIG. 1 in this reference shows a power converter system of one MW. However, the output of three unit inverters is connected to a single transformer, so the phenomenon of the voltage distribution between the unit transformers becoming unbalanced when the a.c. switch is closed does not arise, and the resistor (termed a preloading resistor) shown in these drawings and thyristor switch are provided to protect the fuel cell. Regarding its capacity, it is stated to require from one quarter to one half (15 second rating) of the generated output of the fuel cell, which is different from the objective and action of the present invention.

As described above, with this invention, the aim is to prevent overvoltage generated in the d.c. winding side when inserting a transformer unit in parallel into the system, and to protect the windings and prevent d.c. overvoltage, and also, in the steady state after insertion in parallel in the system, to prevent d.c. overvoltage by suppressing high frequencies generated in the d.c. windings.

Thanks to this, there is no need to design a self-commutated voltage type converter unit or d.c. circuit capacitor that can withstand high d.c. voltage; costs can be brought down to an appropriate level; and reliability can be improved. Also, the problem of imbalance of the excitation impedance of the transformer units affecting the voltage distribution between the transformer units so that one or the other has its capacitor charged to a higher voltage is alleviated, because the insertion of a resistor increases the amount of allowed scatter of the excitation impedance of the transformers, although a description of this has been omitted. This facilitates transformer manufacture.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A power converter device, comprising:
   a plurality of self-commutated voltage type converters, each connected to a common d.c. circuit;
   a plurality of transformers, each having d.c. windings and a.c. windings, each of the d.c. windings being connected to an a.c. output terminal of a respective one of the converters and each of the a.c. windings being connected in series;
   a first a.c. switch means, through which the serially connected a.c. windings of said transformers are connected to a utility power system;
   a capacitor provided in said common d.c. circuit;
   a current limiting means, connected in parallel with said first a.c. switch means, having a series circuit of a current limiting element and a second a.c. switch means;
   wherein prior to starting said converters, said first a.c. switch means is opened and said second a.c. switch means is closed.

2. A power converter device according to claim 1, further comprising:
   a precharging means for charging said capacitor prior to closing of said second a.c. switch means.

3. A power converter device according to claim 1, further comprising:
   a d.c. overvoltage suppression means, having a resistor and an interrupter switch means connected in series, installed in said common d.c. circuit;
   wherein prior to starting said converters, said interrupter switch means is closed.

4. A power converter device according to claim 2, further comprising:
   a d.c. overvoltage suppression means, having a resistor and an interrupter switch means connected in series, installed in said common d.c. circuit,
   wherein prior to starting said converters, said interrupter switch means is closed.

5. A power converter device according to claim 3, wherein after starting of said converters, said interrupter switch means is opened.

6. A power converter device according to claim 4, wherein after starting of said converters, said interrupter switch means is opened.

7. A power converter device comprising:
   a plurality of self-commutated voltage type converters, each connected to a common d.c. circuit;
   a plurality of transformers, each having d.c. windings and a.c. windings, each of the d.c. windings being connected to an a.c. output terminal of a respective one of the converters and each of the a.c. windings being connected in series;
   a first a.c. switch means, through which the serially connected a.c. windings of said transformers are connected to a utility power system;
   a capacitor provided in said common d.c. circuit;
   a current limiting means, connected in series with said first a.c. switch means, having a parallel circuit of a current limiting element and a second a.c. switch means;
   wherein prior to starting said converters, said first a.c. switch means is closed and said second a.c. switch means is opened.

8. A power converter device according to claim 7 further comprising:
   a precharging means for charging said capacitor prior to opening said second a.c. switch means.

9. A power converter device according to claim 7, further comprising:
   a d.c. overvoltage suppression means, having a resistor and an interrupter switch means connected in series, installed in said common d.c. circuit;
   wherein prior to starting said converters, said interrupter switch means is closed.

10. A power converter device according to claim 8, further comprising:
    a d.c. overvoltage suppression means, having a resistor and an interrupter switch means connected in series, installed in said common d.c. circuit;
    wherein prior to starting said converters, said interrupter switch means is closed.

11. A power converter device according to claim 9, wherein after starting of said converters, said interrupter switch means is opened.

12. A power converter device according to claim 10, wherein after starting of said converters, said interrupter switch means is opened.

13. Method for starting a power converted device, including a plurality of self-commutated voltage type converters, each connected to a common dc circuit, a plurality of transformers, each having an iron core, dc windings and ac windings, each of the dc windings being connected to an ac output terminal of a respective one of the converters and each of the ac windings being connected in series, an ac switch means through which the serially connected ac windings of said transformers are connected to a utility power system, a capacitor provided in said common dc circuit, a precharging means for charging said capacitor, and a dc overvoltage suppression means having a resistor and an interrupter switch means connected in series in said common dc circuit, said method comprising:

charging said capacitor by said precharging means prior to closing said ac switch means;

operating each of said transformers so that the magnetic flux density in the rated use state is maintained to a value less than half of the maximum magnetic flux density of its iron core; and closing said interrupter switch means prior to starting said converters.

14. Method for starting a power converted device according to claim 13, said method further comprising:

opening said interrupter switch means after starting of said converters.

* * * * *